United States Patent [19]

Yamashita et al.

[11] Patent Number: 5,379,277
[45] Date of Patent: Jan. 3, 1995

[54] PATH MONITORING BIT EXTRACTION DEVICE

[75] Inventors: Hiroshi Yamashita, Tokyo; Toshiyuki Ojima, Miyagi, both of Japan

[73] Assignee: NEC Corporation, Tokyo, Japan

[21] Appl. No.: 75,105

[22] Filed: Jun. 11, 1993

[30] Foreign Application Priority Data

Jun. 17, 1992 [JP] Japan .................................. 4-157190

[51] Int. Cl.$^6$ ............................................. H04J 3/14
[52] U.S. Cl. .................................... 370/14; 370/58.2; 370/68.1; 370/110.1; 365/189.01; 365/230.01
[58] Field of Search .................. 370/58.2, 68.1, 100.1, 370/105.1, 110.1, 14; 365/189.01, 230.01

[56] References Cited

U.S. PATENT DOCUMENTS

| 5,113,395 | 5/1992 | Murakami et al. | 370/102 |
| 5,128,939 | 7/1992 | Takatori et al. | 370/100.1 |
| 5,172,376 | 12/1992 | Chopping et al. | 370/100.1 |
| 5,271,006 | 12/1993 | Ashi et al. | 370/84 |

Primary Examiner—Douglas W. Olms
Assistant Examiner—Russell W. Blum
Attorney, Agent, or Firm—Whitham, Curtis, Whitham & McGinn

[57] ABSTRACT

A path monitoring bit extraction device in a transmission communication system for dividing a information transmission frame into a plurality of blocks and assigning time slots in the blocks to data of a plurality of paths respectively including a path monitoring bit for transmission in a time division multiplexing manner. The path monitoring bit extraction device comprises a readable and writable memory and detection means for detecting multiplexing positions of the path monitoring bits and block start position in the information transmission frame. Write enabling means enables writing in the memory in response to detection timing of the multiplexing position of the path monitoring bit by the detection means. Write address generating means is responsive to detection of the block start position by the detection means and generates a write address for the memory to 0 vary the value from an initial value in sequence, read address generating means is responsive to a frame pulse and generates a read address for the memory to vary the value from an initial value in sequence.

7 Claims, 9 Drawing Sheets

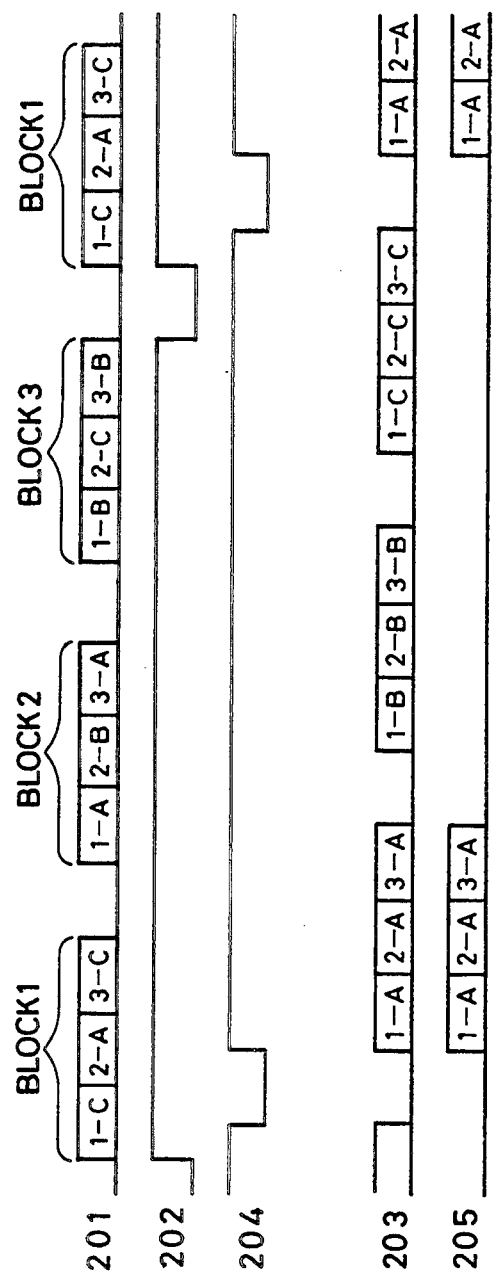

PATH MONITORING BIT EXTRACTION DEVICE

BACKGROUND OF THE INVENTION

The present invention relates generally to a path monitoring bit extraction device. More specifically, the invention relates to a path monitoring bit extraction device in a transmission communication system in which an information transmission frame is divided into a plurality of blocks, and time slots of these blocks are assigned to data of a plurality of paths respectively including path monitoring bits for transmission in time division multiplexing manner.

Such type of extraction device for a path monitoring bit has been known as a path alarming terminal device. The path alarming terminal will be discussed hereinafter with reference to FIGS. 11A and 11B. In NNI(Network Node Interface) hierarchy according to the CCITT doctrine, three information blocks of the VC3 path (Virtual Container 3 Path) as a multiplexing unit are multiplexed in a frame of a multiplexing signal, which is thus expressed as VC3×3, as shown in FIG. 11A.

In each VC3 path of the multiplexing unit, a path monitoring bit for monitoring the path is contained in addition to data to be transmitted, which path monitoring bit is various alarming information detected in the period of the path.

The frame format of FIG. 11A can be illustrated in a form of timing chart as shown in FIG. 11B. Information transmission frame is divided into a plurality of blocks 1~3. Each of the blocks 1~3 is further divided into a plurality of time slots. Data in a first path is divided into 1-C, 1-A, 1-B. The data 1-C is superimposed to the first time slot of the block 1. Similarly, the data 1-A is superimposed to the first time slot of the second block 2 and the data 1-B is superimposed to the first time slot of the third block 3. In a similar manner, respective data of the second and third paths, are superimposed and data in the three paths are multiplexed in a time division manner.

It should be noted that SOH means a section overhead and a pointer represents the position of the path monitoring bit in each path.

The path alarming terminal device is adapted to detect and extract the path monitoring bit of each path from the frame. FIG. 12 is a schematic block diagram of the path alarming terminal device. In the shown construction, all data of the information transmission frame 201 is passed through a frame aligner 21 to match the phases of frames of respective path. Then, the path monitoring bit of each path is extracted.

FIG. 13 is a timing chart of the operation of the path alarming terminal device. An input data 201 is input to the frame aligner 21 and sequentially written in a memory in the frame aligner 21 in synchronism with write frame pulse 202. Output data 203 is read out from the frame aligner 21 in a condition where each path is matched to the frame phase by a reading frame pulse 204. The output data 203 is input to a path alarming terminal circuit 22. In the path alarming terminal circuit 22, only the path monitoring bit is extracted and output as a path alarming output signal 205. It should be noted that, in FIG. 13, the data 1-A of the first path, the data 2-A of the second path and the data 3-A of the third path are the path monitoring bits for respective paths.

In such prior art, despite of the fact that the ratio of capacity occupied by the path monitoring bit is small relative to overall data, the frame aligner is required to have a memory of a capacity capable of maintaining all data in order to match the phase of respective paths. This is clearly wasteful and defective.

SUMMARY OF THE INVENTION

It is an object of the present invention to provide a path monitoring bit extraction device which can extract a path monitoring bit with a smaller capacity of memory.

In order to accomplish the above-mentioned and other objects, a path monitoring bit extraction device in a transmission communication system for dividing an information transmission frame into a plurality of blocks, and assigning time slots in the blocks to data of a plurality of path respectively including a path monitoring bit for transmission in a division multiplexing manner.

The path monitoring bit extraction device comprises
a readable and writable memory and
detection means for detecting multiplexing positions of the path monitoring bits and block start position in the information transmission frame.

Write enabling means enables writing in the memory in response to detection timing of the multiplexing position of the path monitoring bit by the detection means.

Write address generating means is responsive to detection of the block start position by the detection means and generates a write address for the memory to vary the value from an initial value in sequence.

Read address generating means is responsive to a frame pulse and generates a read address for the memory to vary the value from an initial value in sequence.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 13 is a timing chart showing the operation of the blocks of FIG. 12.

DESCRIPTION OF THE PREFERRED EMBODIMENT

The preferred embodiment of a path monitoring bit extraction device according to the present invention will be discussed in detail hereinafter with reference to the drawings.

Figure 1:
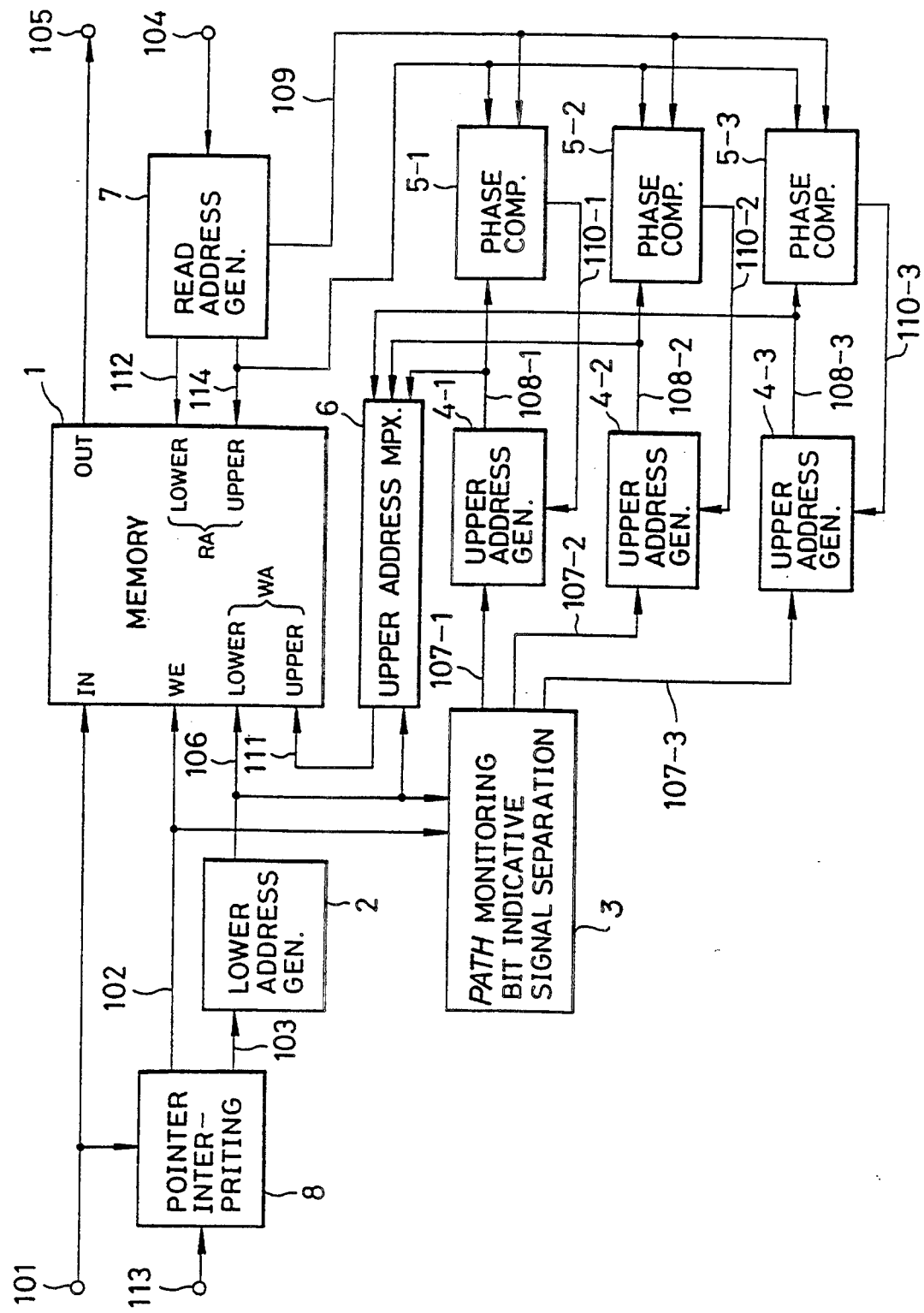
FIG. 1 is a block diagram of the preferred embodiment of a path monitoring bit extraction device according to the present invention.

FIG. 1 is a block diagram of the preferred embodiment of the invention. A memory 1 is a RAM to be written and read. Input data 101 is written in a write address WA (upper address 111 and lower address 106) in response to a write enabling signal WE (102).

A pointer interpreting portion 8 receives as inputs the input data 101 and the frame pulse 143 to generate a path monitoring bit indicative signal 102 which represents a position of multiplexing of the path monitoring bits, and a block indicative signal 103 representing a block start position. The path monitoring bit indicative signal 102 serves as the write enabling signal WE of the memory 1.

The lower address generating portion 2 is responsive to the block indicative signal 103 to generate a lower address 106 of the write address of the memory 1. The path monitoring bit indicative signal separating portion 3 inputs the lower address 106 and a monitoring bit indicative signal 102 to separate the path monitoring bit indicative signal 107-1 ~ 107-3 (a signal representative of the multiplexing position of respective path monitoring bits of respective paths) for outputting.

The upper address generating portions 4-1 ~ 4-3 are provided corresponding to the paths. The upper address generating portion 4-1 ~ 4-3 are responsive to the corresponding path monitoring bit indicative signals 107-1 to 107-3. At every occurrence of input of the path monitoring bit indicative signals 107-1 ~ 107-3, condition values are reversed between (0 or 1). These condition values (1 or 0) are written and introduced as writing upper addresses 108-1 ~ 108-3. The condition values are also controlled to reverse by respective slip control signals 110-1 ~ 110-3 of later discussed phase comparing portions 5-1 ~ 5-3. These upper addresses 108-1 ~ 108-3 are multiplexed by an upper address multiplexing portion 6 and then used as the writing upper address 111 of the memory 1.

The reading out address generating portion generates a read address RA (upper address 114 and lower address 112) of the memory 1 in response to a reading out: frame pulse 104. Also, the read address generating portion 7 generates a window signal 109 for address phase comparison in the phase comparing portions 5-1 ~ 5-3.

The phase comparing portions 5-1 ~ 5-3 are provided corresponding to the path and adapted to detect: phase differences between the reading out upper address 114 and the writing upper addresses 108-1 ~ 108-3. The phase comparing portions 5-1 ~ 5-3 are active to detect the relative phase difference between the writing and reading upper addresses only while the window signal 109 is active. If the relative phase difference becomes substantially zero to substantially overlap the writing and reading upper addresses, correct path monitoring bit reading out is not possible. By slip controlling the writing upper address, the relative phase difference is adjusted to be a constant. Therefore, the slip control signals 110-1 ~ 110-3 are generated and input to respective upper address generating portions 4-1 ~ 4-3.

Figure 2:
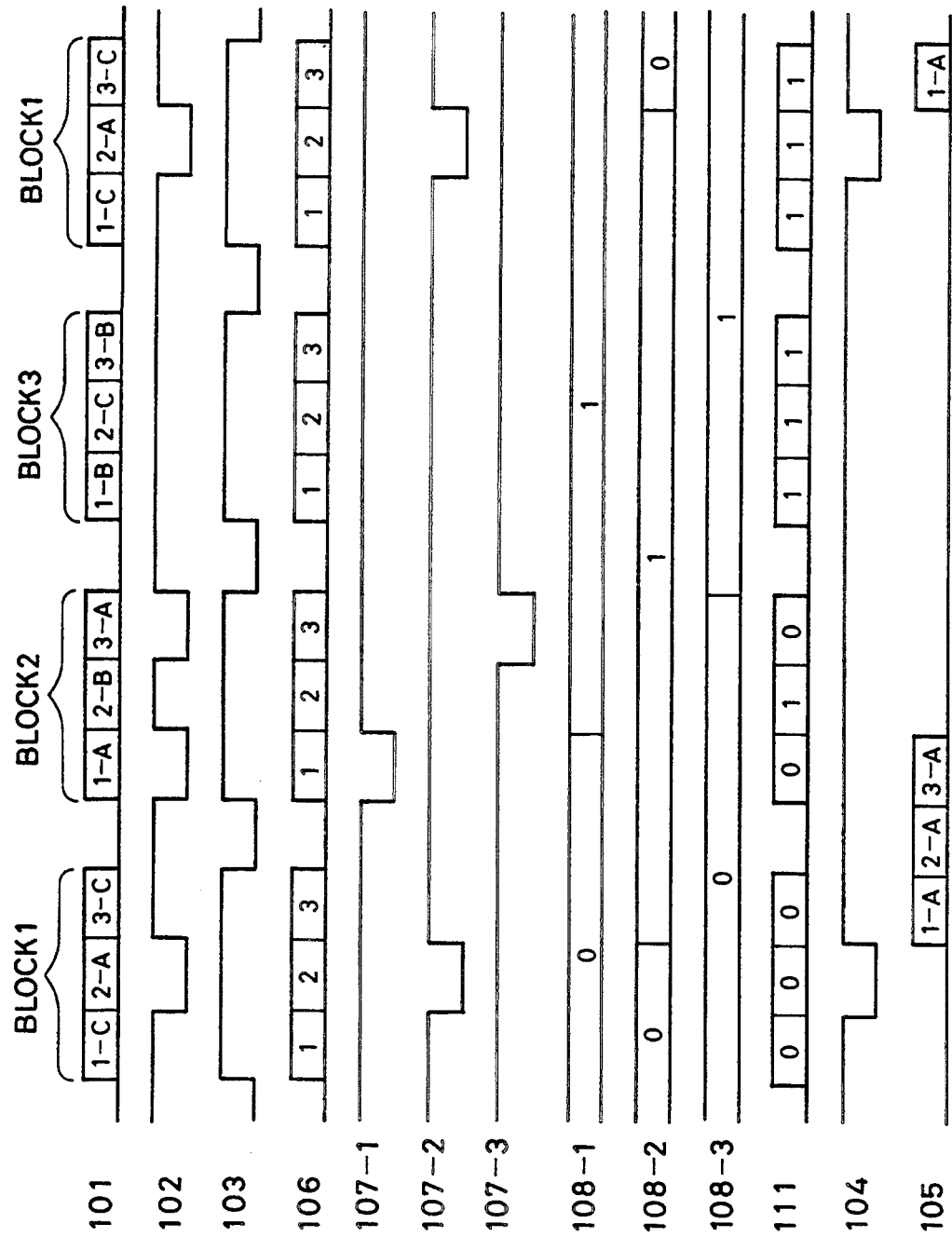
FIG. 2 is a timing chart showing an operation of blocks of FIG. 1.
Figure 11A:
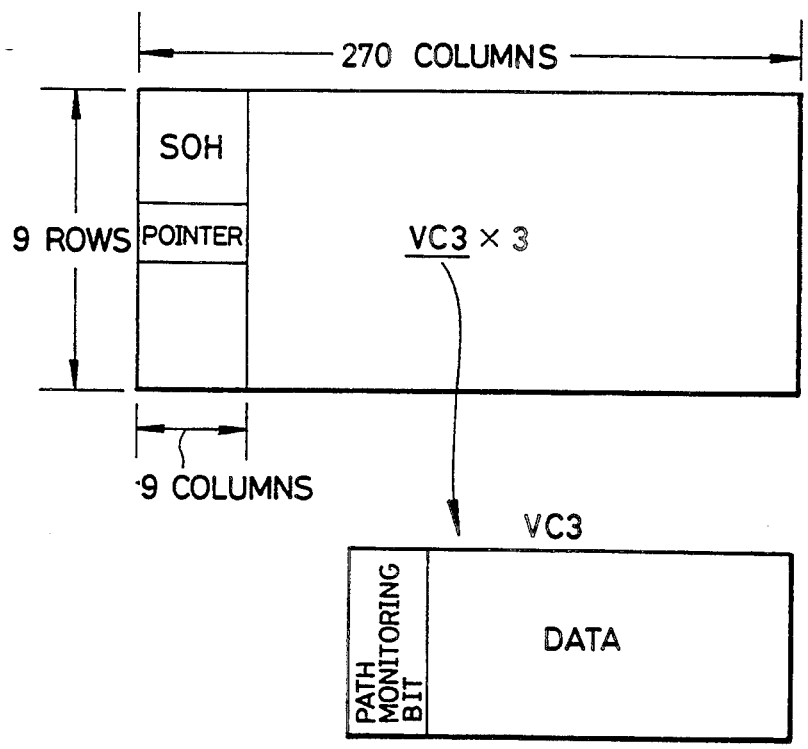
FIGS. 11A and 11B are illustration showing a information transmission frame format of NNI hierarchy in accordance with CCITT doctrine.
Figure 11B:
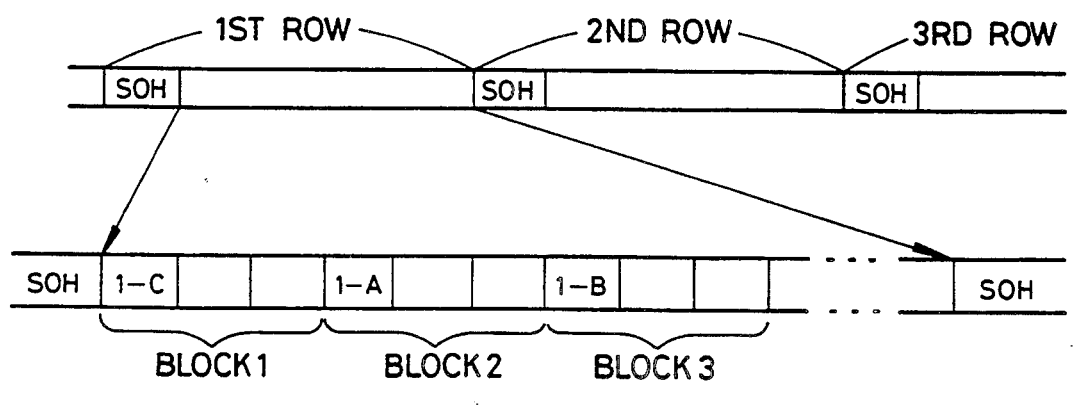
Figure 12:
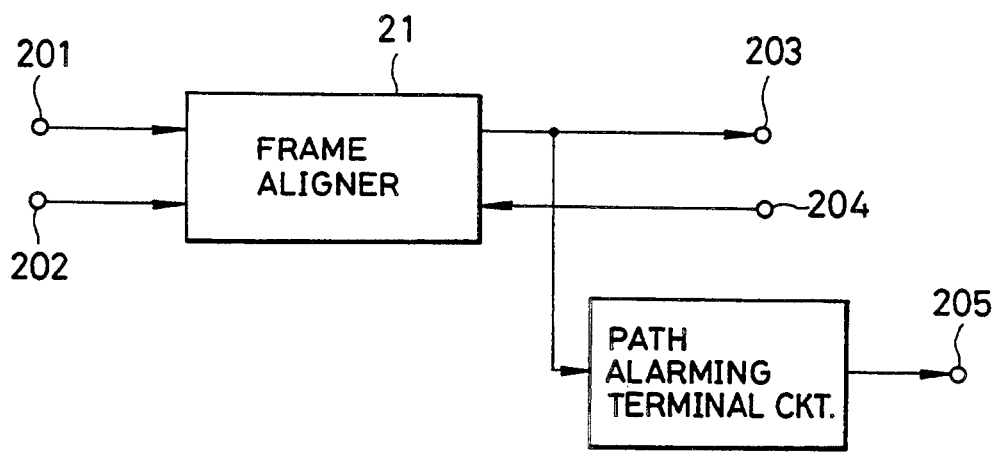
FIG. 12 is a block diagram of the path alarming terminal device of the prior art.

FIG. 2 is a timing chart showing operation of the block of FIG. 1. Similarly to the example discussed in connection with FIGS. 11A, 11B and FIG. 13, it illustrates a case where three information blocks of VC3 path as a multiplexing unit are multiplexed. The path monitoring bits of respective paths 1 ~ 3 are represented by 1-A, 2-A and 3-A.

Figure 3:
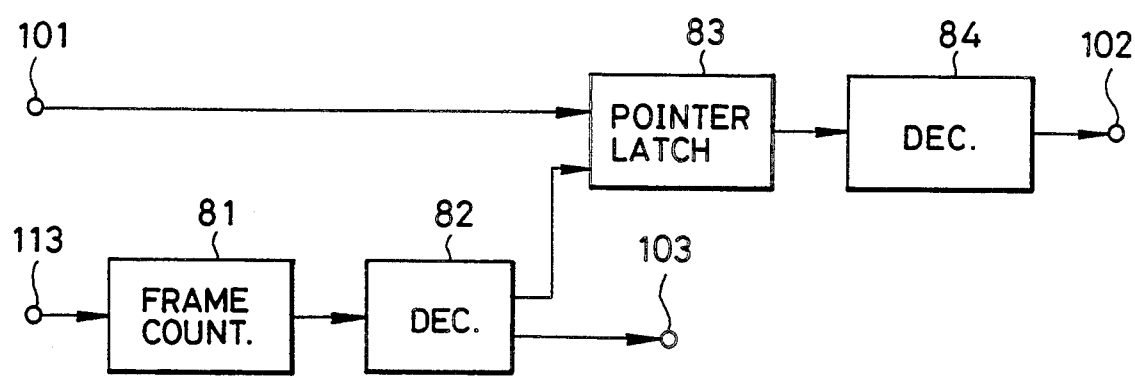
FIG. 3 is an illustration showing a construction of a pointer interpreting portion 8 of FIG. 1.

The input data 101 and the frame pulse 113 are input to the pointer interpreting portion 8 so that the path monitoring bit indicative signal 102 and the block indicative signal 103 are generated. FIG. 3 is a block diagram of the pointer interpreting portion 8. A frame counter 81 is adapted to a count up a basic clock (not shown) of the data 101 from an initial value in response to the frame pulse 113. The position of the pointer (see FIG. 11A) and the block start position can be derived by decoding the counter value of the frame counter 81 by a decoder. The block start position is output as the block indicative signal 103. The pointer in the input data 101 which is latched by a pointer latch 83 is decoded by a decoder 84 for deriving the position of the path monitoring bit of each path. The output of the decoder 84 serves as the path monitoring bit indicative signal 102 and also serves as the write enabling signal WE for the memory 1.

Figure 4:
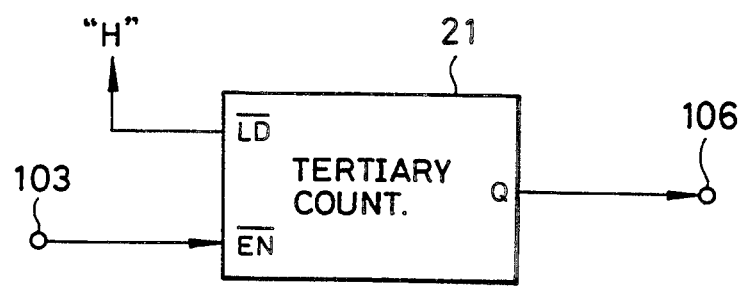
FIG. 4 is an illustration showing a construction of a lower address generating portion 2 of FIG. 1.

The block indicative signal 103 is input to the lower address generating portion 2. Then, the writing lower address 106 is generated by the lower address generating portion 2. FIG. 4 shows the construction of the lower address generating portion 2. As shown, the lower address generating portion 2 comprises a tertiary counter for counting "1", "2", and "3" in order in response to the block indicative signal 103. The tertiary counter performs a count-up operation in synchronism with the basic clock (not shown) of the input data. It should be appreciated that "1", "2" and "3" of the lower address correspond to path 1, 2, 3.

Figure 5:
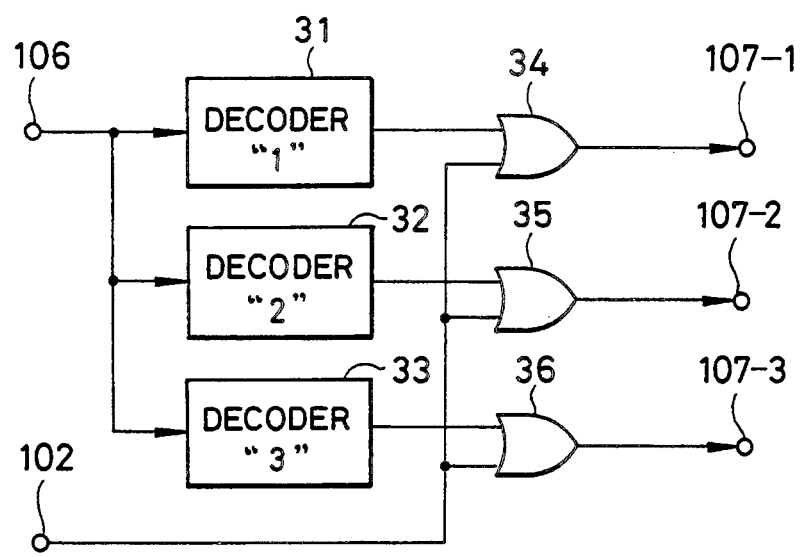
FIG. 5 is an illustration showing a construction of a path monitoring bit indicative signal separating portion 3 of FIG. 1.

The path monitoring bit indicative signal 102 and the lower address 106 are input to the path monitoring bit indicative signal separating portion 3. The path monitoring bit indicative signal separating portion generates the upper bits 107-1 ~ 107-3 in response thereto. As shown in FIG. 5, the path monitoring bit indicative signal separating portion 3 comprises a "1" decoder 31, "2" decoder 32 and "3" decoder 33 for respectively detecting "1", "2", "3" of the lower address 106. The outputs (low active) of these decoders 31 ~ 33 respectively become one inputs of OR gates 34 ~ 36. To the other input or corresponding the OR gates 34 ~ 36, the path monitoring bit indicative signal 102 (low active) is applied. Accordingly, at the outputs of the OR gates, 34 ~ 36, the path monitoring bit indicative signal 107-1 ~ 107-3 corresponding to respective paths can be obtained separately.

Figure 6:
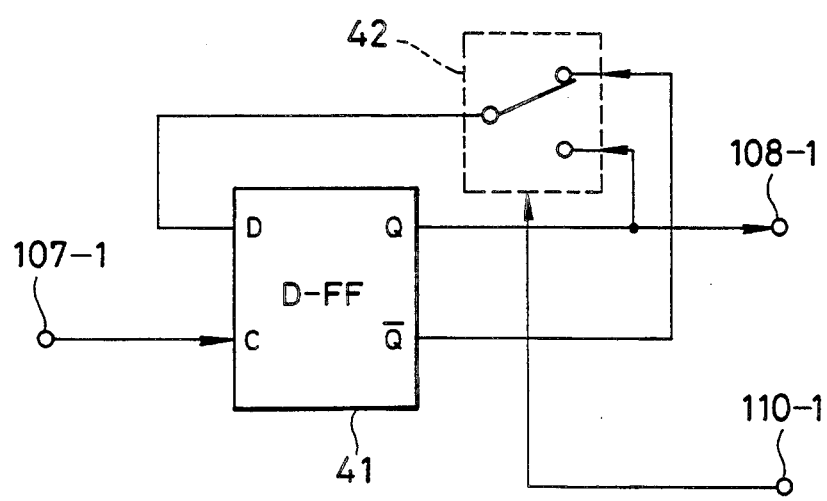
FIG. 6 is an illustration showing a construction of an upper address generating portion 4-1 of FIG. 1.

The path monitoring bit indicative signal 107-1 ~ 107-2 separated for respective paths are input to upper address generating portions 4-1 ~ 4-3 for generating the upper addresses 108-1 ~ 108-3 of respective paths. FIG. 6 shows a concrete example of the upper address generating portion 4-1. Other upper address generating portions 4-2 and 4-3 are constructed in the same manner.

The upper address generating portion 4-1 mainly comprises a D-type flip-flop 41 having a flip-flop construction for reversing the condition value (1 or 0) at every input of the path monitoring bit indicative signal 107-1 in toggle fashion. The Q output of the flip-flop 41 serves as the upper address 108-1. The upper address generating portion 4-1 includes a switch 42 for performing slip control by the slip control signal 110-1. By switching this switch 42 by the slip control signal 110-1, the condition value of the flip-flop 41 can be reversed.

Figure 7:
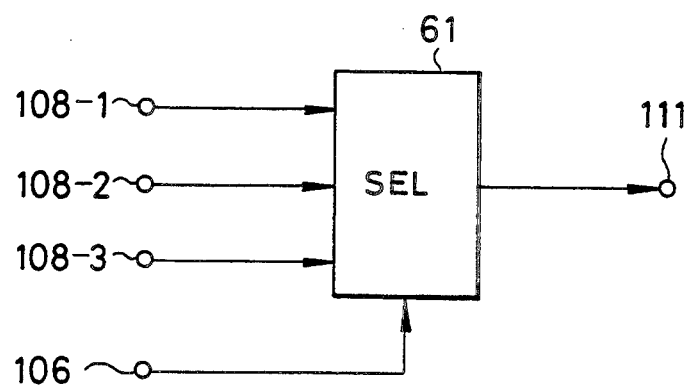
FIG. 7 is an illustration showing a construction of an upper address multiplexing portion 6 of FIG. 1.

The upper addresses 108-1 ~ 108-3 of respective paths are multiplexed by the upper address multiplexing portion 6. The upper address multiplexing portion 6 comprises a 3:1 selector 61, as shown in FIG. 7, for selecting one of the upper address 108-1 of the path 1. The upper address 108-2 of the path 2 and the upper address 108-3 of the path 3 corresponding to respective content "1", "2", "3" of the lower address 106 to output as the writing upper address 111.

Figure 8:
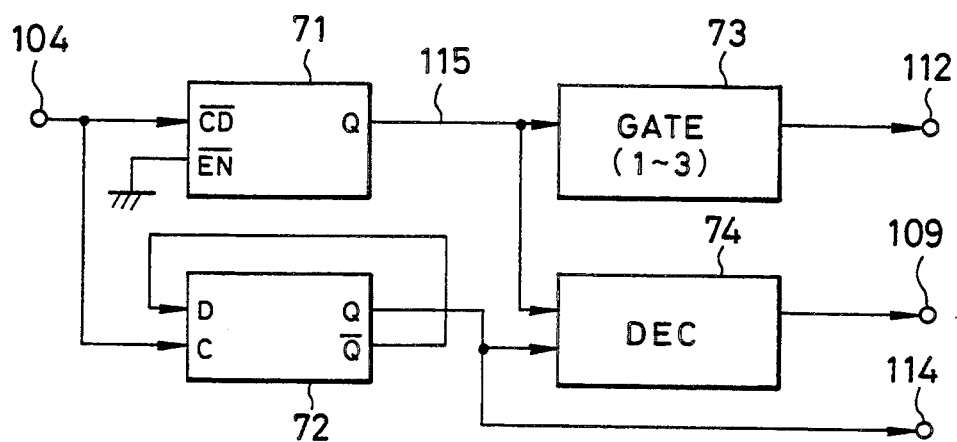
FIG. 8 is an illustration showing a construction of a read address generating portion 7 of FIG. 1.
Figure 9:
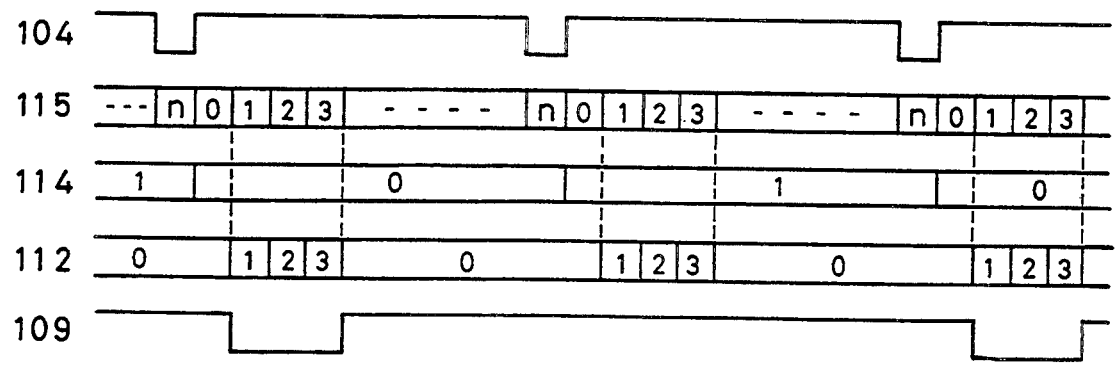
FIG. 9 is a timing chart showing an operation of the read address generating portion 7.

FIG. 8 is a block diagram of the read address generating portion 7 and FIG. 9 is a timing chart of the operation thereof. The frame pulse 104 for reading out is input to a frame counter 71. The frame counter 71 is responsive to the frame pulse 104 to count-up a reading out side basic clock (not shown) from 0 to n. Only "1" ~ "3" among the counter output 115 of the frame counter 71 are output via a gate 73 as the reading out lower address 112.

The frame pulse 104 for reading out is input to the D-type flip-flop 72 which is a toggle type flip-flop to reverse the condition value (0 or 1) at every input of the frame pulse 104. The Q output of the flip flop serves as the reading out upper address 114. Also, the Q output of the flip flop 72 is applied to a decoder 74. The decoder 74 is designed to output a decoder output (low active) 109 when the lower address is "1", "2", "3" and the upper address is "0". The decoder output serves as a window signal 109 for phase comparison.

The window signal 109 is input to phase comparing portions 5-1 ~ 5-3 so that the relative phase difference between the writing upper addresses 108-1 ~ 108-3 and the reading out upper address 114 are detected while the window signal 109 is held active. If the relative phase difference becomes substantially zero, writing in and reading out for the same address area in the memory 1 is performed at substantially the same timing causing an error. Therefore, slip control for the upper address is provided.

Figure 10A:
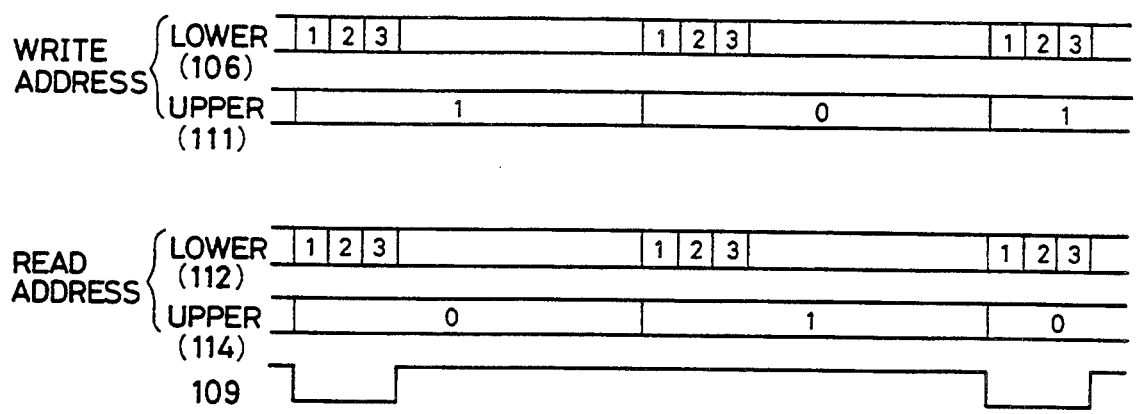
FIGS. 10A and 10B are timing charts for discussion of a slip control of the upper address generating portions 4-1 to 4-3.
Figure 10B:
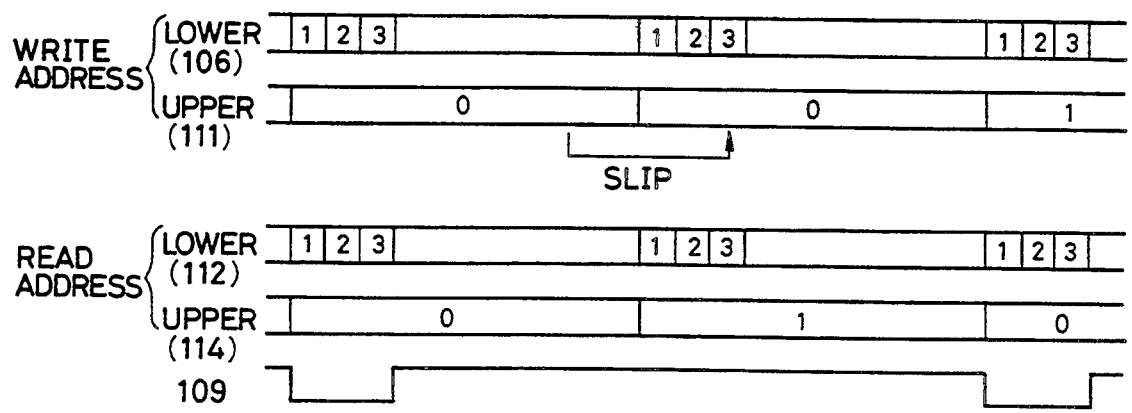

FIGS. 10A and 10B are timing charts illustrating the slip control. At first, FIG. 10A is a timing chart showing a relationship of addresses when writing and reading in and from the same address area is not performed at the same timing. In this case, since the upper addresses for writing and reading have the given difference, the address areas of the memory 1 for writing and reading are different from each other so that no problem arises.

On the other hand, as shown in FIG. 10B, if the upper addresses for writing and reading are coincident to each other, it may be a cause of error. Therefore, the phase comparison portions 5-1 ~ 5-3 detect this fact to produce the slip control signals 110-1 ~ 110-3. In response to the slip control signal, the switches 42 shown in FIG. 6 are switched over and the condition values of the flip-flop 41 is reversed in the upper address generating portions 4-1 ~ 4-3 for enabling slip control.

In the phase comparing portions 5-1 ~ 5-3, the upper addresses for writing and reading are compared during the active period of the window signal 109. However, since the active period of the window signal 109 is the period where the reading out upper address 114 is held "0" (see FIG. 9), it is possible to detect the phase difference by detecting whether the writing upper addresses 108-1 ~ 108-3 are "0" or "1" during the active period of the window signal 109.

It should be noted that although the foregoing embodiment implements three as the number of VC3 paths as the multiplexing unit, it should be clear that the number can be m (m≧4). In this case, the lower addresses for writing and reading becomes 1 ~ m.

As set forth above, according to the present invention, since only path monitoring bits are selectively written in and read from the memory without passing through the frame aligner, extraction of the path monitoring bit can be performed with substantially small memory capacity.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A path monitoring bit extraction device in a transmission communication system for dividing an information transmission frame into a plurality of blocks including a path monitoring bit and assigning time slots in said blocks to data of a plurality of paths respectively for transmission in a time division multiplexing manner, comprising:

a readable and writable memory;

detection means for detecting multiplexing positions of said path monitoring bits and a block start position in said information transmission frame, wherein said detection means includes means for detecting the multiplexing position of said path monitoring bit and said block start position on the basis of a frame pulse of said information transmission frame and transmitted information;

write enabling means for enabling writing in said memory in response to detection timing of the multiplexing position of said path monitoring bit by said detection means;

write address generating means responsive to detection of said block start position by said detection means for generating a write address for said memory to vary the value from an initial value in sequence;

read address generating means responsive to a frame pulse for generating a read address for said memory with to vary the valve from an initial value in sequence, wherein said write address generating means comprises:

lower address generating means responsive to the detection timing of said block start position for generating a lower address of said write address to vary the value from an initial value in sequence;

means for generating a path monitoring bit indicative of the position of the path monitoring bit for each path on the basis of the lower address corresponding to the path and the multiplexing position of said path monitoring bit; and reversing means provided for reversing a condition value in response to a corresponding path monitoring bit, and said condition value being an upper address.

2. A path monitoring bit extraction device as set forth in claim 1, wherein said path monitoring bit indicative signal generating means comprises:

means provided in correspondence to each path for detecting that said lower address is an address corresponding to own path; and means responsive to the result of detection for outputting the multiplexing position of said path monitoring bit as the path monitoring bit indicative signal of the own path.

3. A path monitoring bit extraction device as set forth in claim 1, wherein said write address generating means further includes selection means for selecting an upper address of said write address corresponding to the path on the basis of the path corresponding lower address, the selected upper address forming said write address together with said lower address.

4. A path monitoring bit extraction device as set forth in claim 3, wherein said read address generating means comprises:

lower address generating means for generating a lower address varying from an initial value thereof in sequence in response to a frame pulse for reading out; and a reversing means for reversing a condition value in response to said frame pulse for reading out, and said condition value is an upper address.

5. A path monitoring bit extraction device in a transmission communication system for dividing a information transmission frame into a plurality of blocks including a path monitoring bit and assigning time slots in said blocks to data of a plurality of paths respectively for transmission in a time division multiplexing manner, comprising:

a readable and writable memory;

detection means for detecting multiplexing positions of said path monitoring bits and block start position in said information transmission frame;

write enabling means for enabling writing in said memory in response to detection timing of the multiplexing position of said path monitoring bit by said detection means:

write address generating means responsive to detection of said block start position by said detection means for generating a write address for said memory to vary the value from an initial value in sequence;

read address generating means responsive to a frame pulse for generating a read address for said memory with to vary the value from an initial value in sequence; and a phase control means for controlling a relative phase difference between said read address and said write address to be a constant by detecting the relative phase difference thereof, wherein said write address generating means comprises:

lower address generating means responsive to the detection timing of the block start position for varying the lower address of said write address in sequence from the initial value;

means for generating the path monitoring bit signal, said path monitoring bit signal being indicative of the position of the path monitoring bit varying in sequence from an initial value on the basis of said path corresponding lower address and the multiplexing position of said path monitoring bits; and means provided for each path for reversing a condition value in response to the corresponding path monitoring bit, and said condition value is an upper address.

6. A path monitoring bit extraction device as set forth in claim 5, wherein said read address generating means comprises:

lower address generating means for generating the lower address varying in sequence from an initial value, in response to the frame pulse for reading; and reversing means for reversing the condition value in response to said frame pulse for reading, and said condition value is said upper address.

7. A path monitoring bit extraction device as set forth in claim 6, wherein said phase control means comprises:

comparing means for comparing the upper addresses of said write address and said read address; and means for reversing said condition value of said reversing means generating the upper address of said write address when the result of comparison of said comparing means shows matching of said upper addresses.

* * * * *